United States Patent [19]

Fink

[11] 4,353,811
[45] Oct. 12, 1982

[54] POWER RECOVERY PROCESS USING RECUPERATIVE HEAT EXCHANGE

[75] Inventor: Allen H. Fink, Des Plaines, Ill.

[73] Assignee: UOP Inc., Des Plaines, Ill.

[21] Appl. No.: 213,780

[22] Filed: Dec. 8, 1980

[51] Int. Cl.³ .................... B01J 21/20; F02C 3/00; F02C 7/00; C10J 3/84
[52] U.S. Cl. .................... 252/417; 48/197 R; 60/39.02; 208/161; 208/162; 252/414; 252/420; 423/215.5
[58] Field of Search ............ 252/417, 416, 419, 411 R, 252/414, 420; 208/161, 162, 164; 48/197 R; 60/39.02, 39.03, 39.05; 55/59; 423/215.5

[56] References Cited

U.S. PATENT DOCUMENTS

| | | | |
|---|---|---|---|
| 2,431,630 | 11/1947 | Arveson | 252/242 |
| 2,456,148 | 12/1948 | Read, Jr. | 252/414 |
| 2,543,863 | 3/1951 | Martin | 252/417 |
| 3,076,769 | 2/1963 | Pfeiffer | 252/417 |
| 3,104,227 | 9/1963 | Pfeiffer et al. | 252/417 |
| 3,247,129 | 4/1966 | Roelofsen et al. | 252/417 |
| 3,401,124 | 9/1968 | Goulden | 252/417 |
| 3,489,673 | 1/1970 | Stine et al. | 208/72 |
| 3,536,609 | 10/1970 | Stine et al. | 208/72 |
| 3,563,911 | 2/1971 | Pfeiffer et al. | 252/417 |
| 3,909,392 | 9/1975 | Horecky, Jr. et al. | 208/120 |
| 3,953,180 | 4/1976 | Hoffert et al. | 208/161 |
| 4,006,075 | 2/1977 | Luckenbach | 208/164 |
| 4,051,013 | 9/1977 | Strother | 208/78 |
| 4,162,213 | 7/1979 | Zrinscak, Sr. et al. | 208/164 |
| 4,163,364 | 8/1979 | Shirato et al. | 60/39.02 |
| 4,202,167 | 5/1980 | Suggitt et al. | 48/197 R |
| 4,208,384 | 6/1980 | Mitchell | 423/220 |
| 4,270,343 | 6/1981 | Shirato et al. | 60/39.05 |

OTHER PUBLICATIONS

Oil and Gas Journal—A. D. Scheiman, pp. 156, 161, 162, 167 and 170, "Key Factors Must be Weighed in FCC Expander Bypass Selection".
The Oil and Gas Journal, C. W. Strother, "FCC Getting Boost from All-Riser Cracking", May 15, 1972, pp. 102-110.
The Oil and Gas Journal, J. J. Blazek, "Gains from FCC Revival Evident Now", Oct. 8, 1973, pp. 65-70.
The Oil and Gas Journal, W. D. Ford, "FCC Advances Merged in New Design", May 22, 1978, pp. 63-68.
The Oil and Gas Journal, "FCC Power Recovery Saves $18 Million at Refinery", Nov. 19, 1979, pp. 164-168.

Primary Examiner—P. E. Konopka
Attorney, Agent, or Firm—James R. Hoatson, Jr.; John F. Spears, Jr.; William H. Page, II

[57] ABSTRACT

A process is disclosed for recovering mechanical energy from a particle-containing pressurized high temperature gas stream such as the flue gas stream of an FCC regenerator. Heat is removed from the gas stream in two different indirect heat exchangers in series flow and the gas stream is then scrubbed by contact with a liquid to remove entrained particles. The gas stream is then reheated by exchange against itself in the second heat exchanger and depressurized in a power recovery expander which produces useful mechanical energy. The scrubbed gas stream may be further heated in the FCC regenerator or some other high temperature location prior to being depressurized in the power recovery expander.

10 Claims, 1 Drawing Figure

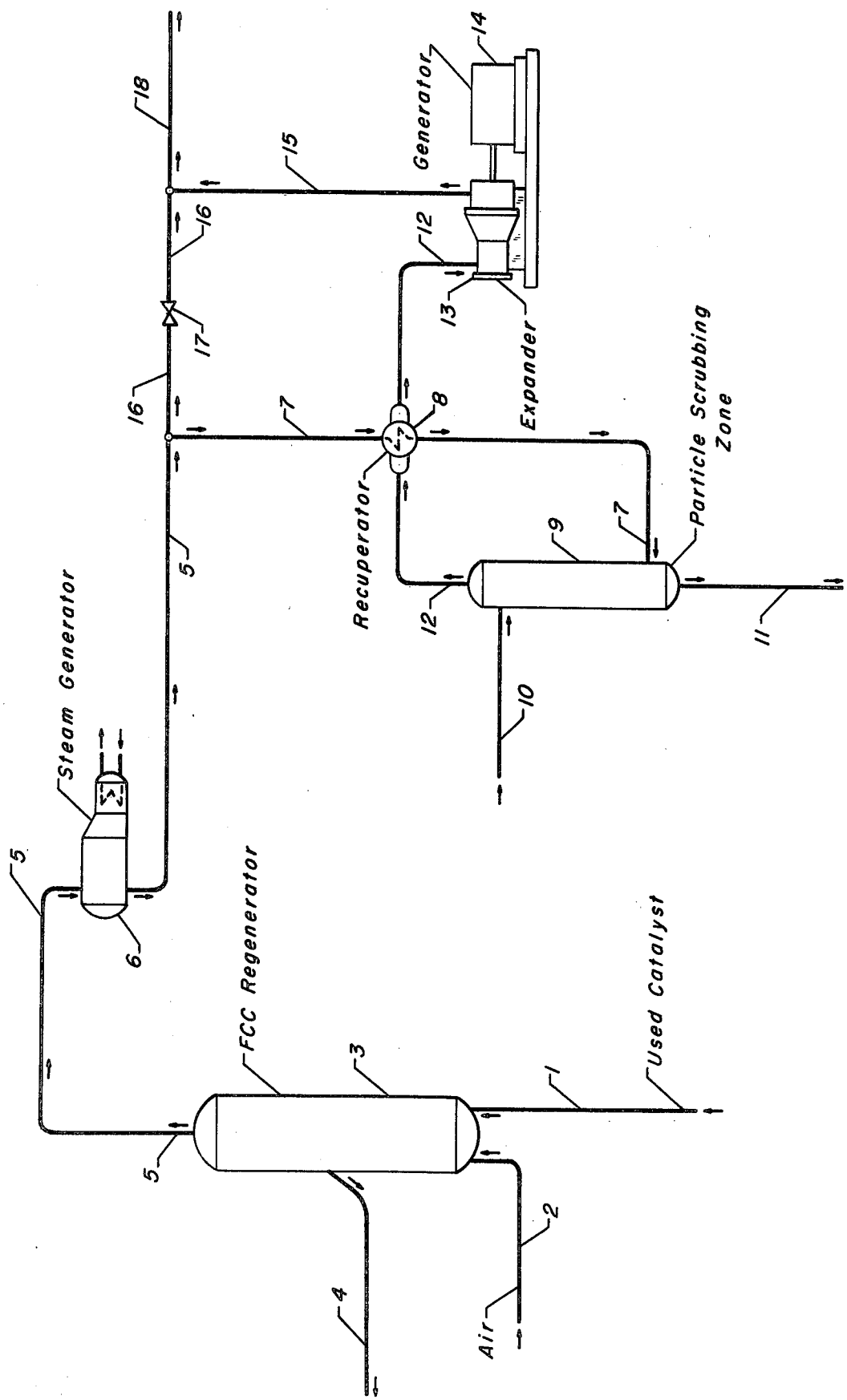

POWER RECOVERY PROCESS USING RECUPERATIVE HEAT EXCHANGE

FIELD OF THE INVENTION

The invention relates to a power recovery process for recovering mechanical energy by the depressurization of a hot gas stream. Such processes are often employed as part of the air supply systems of the catalyst regeneration zones of fluidized catalytic cracking (FCC) units used in refining petroleum. The invention more specifically relates to a power recovery process for FCC regenerators in which the flue gas stream is passed through a particle removal zone and a turbine-type power recovery expander. The removal of particles from the gas stream is accomplished by contacting the gas stream with a liquid stream.

PRIOR ART

Fluidized catalytic cracking units are in very widespread commercial use and are found in most major refineries. They are described in U.S. Pat. Nos. 4,051,013; 3,536,609; 4,006,075; 3,489,673; 3,563,911 and 3,909,392. A description of the development of FCC units and a comparison of various designs are found respectively in the articles at page 102 of the May 15, 1972 edition of *The Oil and Gas Journal* and at page 65 of the Oct. 8, 1973 edition of *The Oil and Gas Journal*. A more recent article on FCC operation and which includes a diagram of the flow of regenerator flue gas through a power recovery unit is presented at page 63 of the May 22, 1978 edition of *The Oil and Gas Journal*.

Recovering energy from the flue gas stream of the FCC regenerator through the use of a power recovery expander is well-known and is performed commercially. The economics of this are discussed and a flow diagram of the power recovery system is provided in an article at page 164 of the Nov. 19, 1979 edition of *The Oil and Gas Journal*. Regenerator flue gas power recovery systems are also described in U.S. Pat. Nos. 3,076,769; 3,104,227 and 3,247,129 (all Cl. 252-417). These references show that it is known to utilize a tertiary particle separator to remove particles left by upstream separators and that the tertiary separator may be downstream of a steam generator. U.S. Pat. No. 3,401,124 also presents a flue gas power recovery system using an expander turbine. This reference shows the generation of electrical energy by depressurizing flue gas through a turbine, which drives an electrical generator and an air compressor. U.S. Pat. No. 4,163,364 (Cl. 60-39.02) presents a process in which electrical energy is recovered by passing the exhaust gas of a blast furnace through a turbine.

U.S. Pat. No. 2,543,863 (Cl. 252-417) shows in FIG. 2 the water scrubbing of an FCC regenerator flue gas stream after it has passed through a waste heat boiler. U.S. Pat. No. 2,431,630 shows the passage of an FCC regenerator flue gas stream through several indirect heat exchange means followed by contact with a preferably unvolatile scrubbing oil to remove entrained catalyst particles.

U.S. Pat. No. 4,208,384 (Cl. 423-220) is pertinent for its showing of a power recovery process for an FCC regenerator flue gas stream in which particles are removed from a major portion of the flue gas stream and it is then passed through a power recovery expansion zone. A smaller second portion of the flue gas stream is passed into a sour water stripper. This second gas stream has a high solids content because it contains substantially all of the solids originally present in the larger FCC regenerator flue gas stream, of which it is a relatively small part. The second gas stream is used to strip $H_2S$ from sour water so that the $H_2S$ and $CO_2$ of the stripper overhead may be used to neutralize spent caustic. A particle containing water stream is removed from the bottom of the stripper.

BRIEF SUMMARY OF THE INVENTION

The invention provides a power recovery process for use on hot pressurized gas streams in which substantially all entrained particles are removed from the gas stream at a low temperature followed by reheating of the gas stream by indirect heat exchange against itself in a recuperator to a sufficiently high temperature to allow efficient energy recovery by expansion. A broad embodiment of the invention may be characterized as a power recovery process which comprises the steps of cooling an FCC regenerator flue gas stream to a temperature below about 380° C. in a first indirect heat exchange means; further cooling the flue gas stream to a temperature below about 150° C. in a second indirect heat exchange means; removing particles from the flue gas stream by contacting the flue gas stream with a liquid in a particle removal zone; heating the flue gas stream by passage through the second indirect heat exchange means; and depressurizing the flue gas stream in a power recovery expander and thereby recovering mechanical energy from the flue gas stream.

DETAILED DESCRIPTION

The escalating cost of energy has increased the feasibility of many new designs and operating practices designed to provide more efficient power recovery and increased utilization of presently available fossil fuel energy. One area which has been receiving increased attention is the recovery of energy from the flue gas streams of the regeneration zone of fluidized catalytic cracking (FCC) units though the use of power recovery expanders. The use of power recovery expanders on large FCC units is a standard practice, but until recently, the economics of capital costs versus power recovered has not favored the placement of power recovery expanders on smaller FCC units. These smaller units are those which are designed for a hydrocarbon charge rate of less than about 25,000 to 30,000 barrels per stream day. The turbine-type machines utilized as the power recovery expanders can only tolerate the presence of a minimum amount of the highly abrasive catalyst particles in a flue gas stream which is being passed through the expander. It may therefore be necessary for a refinery to install a particle removal zone which removes additional amounts of particles from the flue gas stream in order to utilize a power recovery expander. At the same time, refineries and other industrial facilities are subject to increasingly stringent environmental rules which limit the discharge of particulates into the atmosphere. Some refineries may therefore be required to remove catalyst particles from FCC flue gas even if they do not utilize a power recovery expander.

The development of a synthetic fuels industry is likely to increase the number of large scale refinery-type processing units in which a high temperature superatmospheric gas stream which contains some particulate material may be depressurized for the recovery of useful mechanical energy. These processes are likely to be those which produce a combustible gas from a solid carbonaceous substance such as a coal gasification process. Power recovery may therefore become an important economic consideration in process units other than FCC units.

It is an objective of the subject invention to provide a process for recovering useful energy which may be used to generate electricity or to compress a fluid stream from a relatively high temperature gas stream. It is also an objective of the subject invention to provide a process which allows the economic removal of fine particles from a gas stream at a relatively low temperature followed by the recovery of useful mechanical energy from the gas stream by depressurization. It is a specific objective of the subject invention to provide a power recovery process for use on the flue gas stream of the catalyst regeneration zone of FCC units.

Most major petroleum refineries contain a processing unit referred to as an FCC unit. The function of this unit is to break down high molecular weight hydrocarbons into smaller, lower molecular weight hydrocarbons. An FCC unit is therefore a way to upgrade heavy hydrocarbons to lighter hydrocarbons having a higher economic value. A typical feed stream to an FCC unit comprises a gas oil, such as an atmospheric or vacuum gas oil having an initial boiling point, as determined by the appropriate distillation method, above about 232° C. Heavier feedstocks such as reduced crudes or heavy vacuum gas oils may also be fed to the FCC unit. The products derived from the FCC unit typically include a sizable amount of naphtha, kerosene, and a slightly heavier fuel oil. These streams are then subjected to the appropriate processing to be finished according to the established product specifications for gasoline, jet fuel, and diesel fuel, respectively. An FCC unit will also produce some heavier material and a sizable amount of lighter hydrocarbons including virtually all of the more common $C_5$- acyclic hydrocarbons. These light hydrocarbons are recovered separately and have a high economic value because of the light olefins, such as ethylene and butylene, which are present. These light olefins may be consumed in downstream alkylation or polymerization units to produce such products as high octane gasoline blending components and alkylaromatic hydrocarbons including ethylbenzene.

An FCC unit comprises a reaction zone and a catalyst regeneration zone. In the reaction zone, the feed stream is contacted with a finely divided fluidized catalyst maintained at elevated temperatures and a moderate positive pressure. This contacting causes the conversion of the feed stream to the more volatile products, which are recovered from a vaporous effluent stream of the reaction zone, and the accumulation of carbonaceous deposits referred to as coke on the catalyst. These deposits lessen the catalytic effectiveness of the catalyst. To overcome the activity reduction caused by the coke deposits a stream of used catalyst is continuously removed from the reaction zone and transferred into the catalyst regeneration zone of the FCC unit. The entering catalyst joins a bed of fluidized catalyst retained within the regeneration zone and is contacted with a pressurized stream of air under a high temperature condition such that the carbonaceous deposits on the catalyst are combusted within the regeneration zone. The burning of the coke results in a reactivation or regeneration of the catalyst and also produces a very large amount of heat. The combustion products and the inert components of the oxygen supply stream charged to the regeneration zone are removed from the regeneration zone as a very high temperature gas stream referred to as the flue gas stream of the regeneration zone. This stream may have a temperature of from about 1200° F. to 1350° F. and a pressure of about 25 to 60 psig.

The flue gas stream which is removed from the FCC regeneration zone will normally pass through one or more particle separators located within the regeneration zone designed to remove the majority of the entrained catalyst particles from the flue gas stream. However, it is normally necessary to pass the flue gas stream through at least one tertiary or third stage particle separation zone to further reduce the concentration of highly erosive fine catalyst particles in the flue gas stream prior to the passage of the flue gas stream through a power recovery unit. Separators intended for this purpose are described in U.S. Pat. Nos. 2,941,621; 2,986,278; and 3,415,042. A power recovery expander is a turbine-type device in which the flue gas stream is depressurized to a slightly superatmospheric pressure and which converts a portion of the energy stored in the hot pressurized flue gas stream to useful rotational power. The power recovery expander may be of either the centrifugal type or the axial type. After leaving the power recovery expander, the flue gas stream is then passed to the appropriate waste heat recovery facilities, pollution control facilities or directly to a stack where it is vented to the atmosphere.

In the subject invention, a recuperative heat exchanger is utilized to first reduce the temperature of the flue gas stream to allow the particle removal operation to occur at a relatively low temperature and to then heat the same gas stream to a temperature approaching its original temperature. Removing the catalyst particles at a relatively low temperature allows the utilization of certain techniques, such as liquid scrubbing, which are not feasible at higher temperatures and may reduce the cost of other particle removal techniques such as the use of electrostatic precipitators. The recuperative heat exchanger at the same time reheats the gas stream to a temperature necessary for the practical application of the power recovery expander. The recuperative heat exchange means may be a rotating Ljungstrom type heat exchanger or a static type shell and tube or plate-fin type heat exchanger in which heat is transferred between two gas streams through a solid heat transfer surface which separates the flow of the two gas streams.

Referring now to the Drawing, the overall flow of one embodiment of the subject invention as it is applied to the recovery of useful energy from the flue gas stream of an FCC regenerator is shown.

A stream of used catalyst carried by line 1 and a stream of pressurized air used in the regeneration of the catalyst carried by line 2 are passed into the FCC regenerator 3. This produces regenerated catalyst which is removed from the regenerator in line 4 and passed to the FCC reaction zone not shown. Gas containing a large amount of catalyst passes through cyclone-type separation means not shown which are located within the top portion of the FCC regenerator 3 and emerges as a flue gas stream carried by line 5. Heat is recovered from the flue gas stream in a steam generator 6 and the flue gas stream is then passed into line 7. A portion or all of the flue gas stream may be bypassed through line 16 at a rate controlled by a valve 17 as required. Gas may be allowed to flow through line 16 when the particle scrubbing zone and/or the power recovery unit are not in operation or as part of the control system of the power recovery unit.

The flue gas stream is cooled by indirect heat exchange in the recuperator 8 and passed into a particle scrubbing zone 9 at or near the bottom of this zone. In this zone, the flue gas stream is caused to pass upward countercurrent to a descending liquid which enters the zone in line 10. The descending liquid removes the great majority of the fine catalyst particles which were present in the flue gas stream and is removed from the scrubbing zone through line 11. The thus-cleaned flue gas stream is removed from the scrubbing zone in line 12 and passed through the recuperator 8 wherein it is heated to a temperature which is preferably within 50-70 centigrade degrees of the temperature at which the flue gas stream first entered the recuperator. The flue gas stream then continues through line 12 and enters a power recovery expander 13 wherein it is depressurized to a slightly superatmospheric pressure before being vented to a stack through lines 15 and 18. The power recovery expander 18 in this instance is used to drive an electrical generator 14.

In the subject process the FCC flue gas stream is cooled in two separate heat exchange means in series. It is preferred that heat is removed from the flue gas stream by generating or heating steam in the first heat exchanger in a manner similar to the steam generators now employed on many FCC units. It is also preferred that the second heat exchanger functions as a recuperator in which heat is transferred from the untreated high temperature flue gas stream into the treated low temperature flue gas stream. That is, in the heat exchange means referred to herein as the recuperator, the flue gas stream is heat exchanged against itself following an intermediate particle removal operation. It is preferred that both the first and the second heat exchange means comprise conventional indirect heat exchangers such as Ljungstrom, shell and tube or plate-fin type exchangers. The temperature of the gas stream entering the first heat exchanger should be over 530° C. and is preferably over 650° C. The temperature of the untreated gas stream is preferably between about 260° C. and 400° C. as it enters the second heat exchange means. The untreated gas stream should have a temperature below 150° C. and preferably below 85° C. as it emerges from the second heat exchange means.

After being cooled in the second heat exchange means, the untreated gas stream is passed into a particle removal zone or scrubbing zone. In this zone the untreated gas stream is contacted with a liquid stream under conditions which promote the removal of particles from the gas stream. The liquid may be water, a liquid scrubbing agent containing a mixture of selected chemical compounds dissolved in water or another solvent, or a mixture of hydrocarbonaceous compounds derived from petroleum, coal or oil shale. A liquid having a low volatility at the conditions present within the particle removal zone is preferred. Therefore, if water is the liquid, the particle removal zone should be maintained at a lower temperature than if a heavy cycle oil or vacuum gas oil is employed. A hydrocarbonaceous liquid has the advantage of being adaptable to operations similar to that used in conjuction with FCC slurry oil and can therefore be passed into a settling zone, with settled particles and liquid being pumped to the FCC reaction zone. A hydrocarbonaceous liquid has the disadvantage of possibly creating emissions or pollution problems if any part of the liquid enters the warm vapor stream. However, this would not be a problem if the expander exhaust gas stream is passed into a combustion zone such as a CO boiler as found on older FCC units or a fired heater. Any hydrocarbonaceous compounds used as the scrubbing liquid would preferably have a 10 percent boiling point above 260° C. Water is the preferred liquid for use as a scrubbing liquid.

The particle removal zone is preferably a vertical cylindrical column through which the gas stream passes upward countercurrent to the descending liquid. The use of a spray tower in which the liquid is sprayed into the gas is preferred since the pressure drop imposed on the rising vapor is low. Perforated contacting grids or packing material may be used to ensure good contact but their use is not preferred. The use of demisting means located at the outlet for the treated gas stream is preferred. Other types of gas-liquid contacting apparatus designed for particle removal such as impingement type contactors and cyclones may also be used as the apparatus of the particle removal zone. It is preferred that the particle removal zone is operated at a pressure between about 20 and 80 psig. and with a temperature difference between the entering and exiting gas streams of less than about 55 centigrade degrees.

After being subjected to the particle removal treatment, the gas stream is passed into the second heat exchange means for the second time. In this pass through the recuperator the gas stream is heated to a temperature which is preferably within the range of about 300° C. to 375° C. but which may of course vary from this range. The gas stream is then passed into the power recovery expander and depressurized, with the energy recovered from the gas stream being used for useful work such as driving a compressor or generating electricity. A bypass system which diverts the gas stream around the power recovery expander will normally be employed to prevent overspeeding of the expander. These systems are described in U.S. Pat. Nos. 3,777,486 and 3,855,788. The power recovery expander and the other equipment required to practice the invention are rather specialized, but are available commercially.

In an alternative embodiment of the invention, the treated gas stream is heated after it emerges from the recuperator but before entering the power recovery expander. This heating may be performed by passage through the first heat exchange means, but is preferably achieved by heat exchange in a third heat exchanger. In those instances in which excess heat is produced in the FCC regenerator and this heat is removed by heat exchange, the gas stream may be heated by passage through cooling coils located within the catalyst regeneration zone. In this embodiment the treated gas stream is preferably heated to a temperature above 490° C. and preferably between 530° C. and 700° C. prior to passage into the power recovery expander. These higher temperatures are desired since they increase the efficiency of the energy recovery performed in the expander.

This description of several embodiments of the invention is not intended to exclude from the scope of the invention those other applications and embodiments of the invention which result from normal and expected modification of the inventive concept. For instance, the just described reheating of the treated gas stream may be applied to gas streams other than FCC flue gas streams. As an example of this, the product gas stream of a high pressure coal gasification process unit may be handled as described above with the reheating of the treated gas stream being performed through the use of the recuperative heat exchanger and one or more other heat exchangers upstream of the power recovery expander. In this specific embodiment an ideal heat source for these heat exchangers would be in a methanation zone which upgrades the BTU value of the coal gasification product gas. This type of methanation process is described in many references including U.S. Pat. Nos. 3,511,624; 3,728,093; 3,854,895; 3,870,738; 3,967,936; 4,005,996 and 4,064,156.

The feed gas to the methanation zone is often a hydrogen-rich gas produced by passing the gasification zone effluent through a water gas shift reaction zone and then removing carbon dioxide. The feed gas stream is normally passed through several methanation zones or reactors in series with interstage cooling being provided due to the highly exothermic nature of the methanation reaction and the desire to maintain desired methanation conditions. The heat removed in its interstage cooling of the methanation gases may be used to reheat the treated gasification zone effluent prior to its passage into the power recovery expander. The methanation gases will typically have an interstage reactor outlet temperature between about 305° C. and about 515° C. and will be cooled to about 250° C. to about 345° C. Methanation gases may have reactor outlet temperatures up to approximately 620° C. The extent to which the gasification product gas can be economically heated in the methanation zone will depend on such factors as relative flow rates, methanation conditions, etc.

A preferred embodiment of the subject invention may be characterized as a process for recovering energy from the flue gas stream of the catalyst regeneration zone of a fluidized catalytic cracking unit which comprises the steps of cooling a superatmospheric pressure flue gas stream removed from an FCC catalyst regeneration zone to a temperature between 260° C. and 380° C. by passage through a first indirect heat exchange means in which steam is produced; cooling the flue gas stream to a temperature below about 105° C. in a second indirect heat exchange means; passage the flue gas stream through a particle removal zone in which catalyst particles are removed from the flue gas stream by contact with a liquid under conditions suitable for the transfer of catalyst particles from the flue gas stream to the liquid; heating the gas stream in said second indirect heat exchange means to a temperature above 330° C.; and, passing the flue gas stream through a power recovery expander in which the pressure of the flue gas stream is reduced. In the subject process essentially all of the untreated gas stream enters the second heat exchanger and the contacting zone. Preferably all of the thus treated (particle-free) gas stream enters the second heat exchanger. As used herein the term "essentially all" is intended to refer to a quantity or measurement equal to at least 90 mole percent of the compound, class of compounds or process stream being described by the term.

I claim as my invention:

1. A process for recovering energy from a high temperature flue gas stream of a catalyst regeneration zone of a fluidized catalytic cracking unit which comprises the steps of:
   (a) passing said high temperature flue gas stream having a superatmospheric pressure of between about 25 to 60 psig through a first indirect heat exchange means and cooling the gas stream to a temperature below about 400° C.;
   (b) passing the gas stream through a second indirect heat exchange means and cooling the gas stream to a temperature below 150° C.;
   (c) removing particles from the gas stream in a particle removal zone in which the gas stream is contacted with a liquid under conditions suitable for the transfer of particles from the gas stream to the liquid;
   (d) passing the gas stream through the second indirect heat exchange means and heating the gas stream to a temperature above 300° C. and within 50° to 70° of the temperature of the gas stream entering said second indirect heat exchange means in step (b); and
   (e) depressurizing the gas stream in a power recovery expander and thereby recovering useful mechanical energy from the gas stream.

2. The process of claim 1 further characterized in that the gas stream is heated to a temperature between about 300° C. and about 375° C. in step (d).

3. The process of claim 2 further characterized in that the liquid with which the gas stream is contacted in the particle removal zone is water.

4. The process of claim 2 further characterized in that the liquid with which the gas stream is contacted in the particle removal zone comprises a mixture of hydrocarbonaceous compounds having a 10 percent boiling point above 260° C.

5. The process of claim 1 further characterized in that the gas stream is heated in the catalyst regeneration zone by indirect heat exchange after having passed through the particle removal zone and having been heated in the second indirect heat exchange means but prior to the depressurization of the gas stream in the power recovery expander.

6. A process for recovering energy from a superatmospheric pressure flue gas stream of a catalyst regeneration zone of a fluidized catalytic cracking unit which comprises the steps of:
   (a) cooling said superatmospheric pressure flue gas stream removed from said FCC catalyst regeneration zone having a pressure of between about 25 and 60 psig to a temperature between 260° C. and 380° C. by passage through a first indirect heat exchange means in which steam is produced;
   (b) further cooling said flue gas stream to a temperature below about 105° C. in a second indirect heat exchange means;
   (c) passing the flue gas stream after passage through said second indirect heat exchange means through a particle removal zone in which catalyst particles are removed from the flue gas stream by contact with a liquid under conditions suitable for the transfer of catalyst particles from the flue gas stream to the liquid;
   (d) heating said flue gas stream from said particle removal zone of step (c) in said second indirect heat exchange means to a temperature above 330° C. and within 50°–70° C. of said temperature range of 260° C. to 380° C. of step (a); and,
   (e) passing said heated flue gas stream of step (d) through a power recovery expander in which the pressure of the flue gas stream is reduced.

7. The process of claim 6 further characterized in that the flue gas stream is heated by indirect heat exchange after having passed through the particle removal zone and having been heated in the second indirect heat exchange means.

8. The process of claim 6 further characterized in that the liquid used in the particle removal zone is a hydrocarbonaceous liquid having a 10 percent boiling point above 260° C.

9. The process of claim 8 further characterized in that the flue gas stream is passed into a combustion zone after having passed through the power recovery expander.

10. The process of claim 6 further characterized in that the liquid used in the particle removal zone is water.

* * * * *